No. 657,981. Patented Sept. 18, 1900.
J. M. GERMANSON.
CHAIR.
(Application filed Jan. 2, 1900.)

(No Model.)

Witnesses.
O. H. Keeney.
Anna V. Faust.

Inventor.
Julius M. Germanson.
By Benedict & Morsell.
Attorneys.

THE NORRIS PETERS CO., PHOTO-LITHO., WASHINGTON, D. C.

UNITED STATES PATENT OFFICE.

JULIUS M. GERMANSON, OF MILWAUKEE, WISCONSIN.

CHAIR.

SPECIFICATION forming part of Letters Patent No. 657,981, dated September 18, 1900.

Application filed January 2, 1900. Serial No. 25. (No model.)

*To all whom it may concern:*

Be it known that I, JULIUS M. GERMANSON, of Milwaukee, in the county of Milwaukee and State of Wisconsin, have invented a new and useful Improvement in Chairs, of which the following is a description, reference being had to the accompanying drawings, which are a part of this specification.

My invention has relation to improvements in chairs, and more particularly to revolving chairs.

It relates to the class of chairs wherein the chair-seat may be revolved freely without either raising or lowering it, and when it is desirable or necessary to raise or lower the seat the adjustment may be readily accomplished.

The primary object is to simplify and cheapen the construction for accomplishing the above results; and with this primary object in view the invention consists of the devices and parts or their equivalents, as hereinafter set forth.

Figure 1:
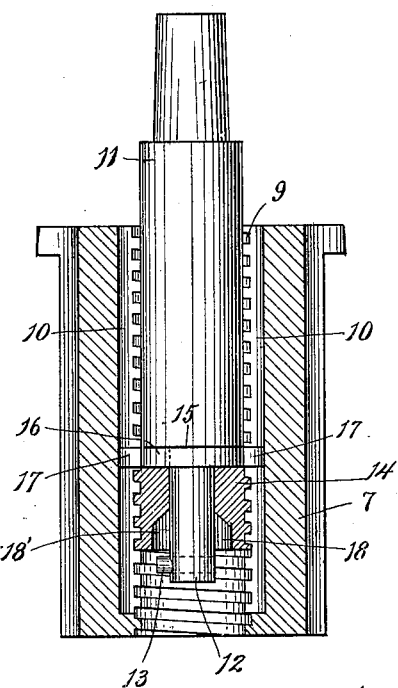
Figure 2:
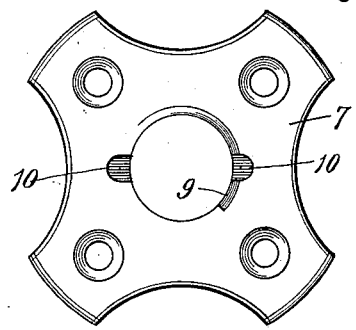
Figure 3:
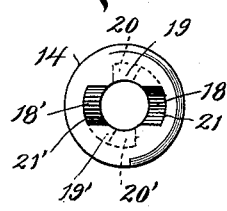
Figure 4:
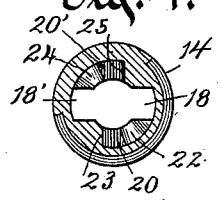
Figure 5:
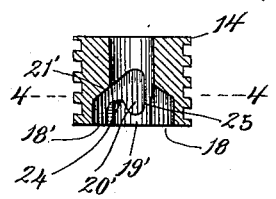
Figure 6:

In the accompanying drawings, Figure 1 is a vertical sectional view of the invention. Fig. 2 is a plan view of the hub. Fig. 3 is a lower end view of the nut. Fig. 4 is a horizontal section of the nut on line 4 4 of Fig. 5. Fig. 5 is a vertical sectional view of the nut, and Fig. 6 is a detail view of the collar.

Referring to the drawings, the numeral 7 indicates the hub, which is of an ordinary form of construction. The said hub is provided centrally with a screw-threaded vertical opening 9. The threads of this opening are interrupted at diametrically-opposite points by vertical recesses 10 10.

The numeral 11 indicates the spindle common in this class of devices and which constitutes the axis of turning for the chair-seat, the said spindle depending from the usual spider (not shown) connected to the bottom of the chair-seat in a well-known manner. The spindle is of proper diameter to fit freely and revolubly in the threaded opening of the hub, as shown clearly in Fig. 1. The lower end of the spindle is provided with a reduced stem 12. The lower end of this stem has projecting laterally therefrom a stud or pin 13.
The stem carries freely and revolubly thereon a nut 14, the exterior threads of said nut adapted to engage the threads of the opening 9 of the hub. Also mounted loosely on the stem, between the upper end of the nut and the shoulder 15 of the spindle, is a collar 16, said collar provided at diametrically-opposite points with projecting lugs 17 17, so positioned as to engage the vertical recesses 10 10. The interior of the nut is peculiarly constructed in order to form, in conjunction with the projecting stud or pin 13, clutch mechanism, whereby the reduced stem of the spindle may be clutched or unclutched to the nut, permitting the spindle when its stem is unclutched from the nut to rotate freely without turning the nut, and consequently without affecting the vertical height of the chair-seat, or when the stem of the spindle is clutched to the nut compelling said nut to turn with the spindle, and thereby either raise or lower the chair-seat, in accordance with the direction of turning of the spindle. The particular construction of the nut consists in providing branch openings 18 18' extending from diametrically-opposite points of the main central opening of the nut. The portions of the metal between the branch openings 18 18' and indicated by the numerals 19 19' are cut or hollowed out above the lower end of and within the nut, said portions 19 19' therefore forming diametrically-opposite wings and the cut-out portions above the wings forming sockets 20 20'. From the branch opening 18 an upwardly-inclined ledge 21 leads to the socket 20, and from the branch opening 18' an upwardly-inclined ledge 21' (the initial and terminal ends of this inclined ledge being opposite to the initial and terminal ends of the ledge 21) leads to the socket 20'. The sockets 20 and 20' are adapted to receive the laterally-extending stud or pin 13, as hereinafter explained. This stud when in the socket 20 is confined between shoulders 22 and 23, shoulder 22 extending a limited distance upwardly from the wing 19, so as to permit the stud to pass over the same in its passage to the socket, and the shoulder 23 formed by the back edge of the inclined ledge 21. The stud when in the socket 20' is confined between similar shoulders 24 and 25, shoulder 24 extending for a limited distance upwardly from the wing 19' and shoulder 25 being formed by the back edge of the inclined ledge 21'.

In adjusting the spindle and its related parts to the hub the nut 14 is turned into the upper end of the threaded opening 9 of the hub. When the nut has been turned into the hub sufficiently far to bring the collar 16 against the top of the hub, said collar is turned so that the projecting lugs 17 thereof will be in line with the recesses 10 10. With the continued turning of the nut the collar and spindle are carried downwardly into the hub until the required height of the chair-seat is attained. When it is desired to revolve the chair-seat without changing the vertical height of said seat, the parts are in the position illustrated in Fig. 1—that is to say, the laterally-extending stud 13 is just clear of the lower end of the nut, this adjustment being maintained by the weight of the chair-seat and spindle, causing the shoulder 15 of the spindle to be seated on the upper side of the collar 16. In this position of the parts it is clear that the spindle can freely revolve without causing any change in the vertical height of the chair-seat, so that a person may occupy the chair and turn around freely therein without disturbing the height to which the chair has been adjusted. The collar 16 is preferably interposed between the top of the nut and the shoulder 15, so as to take all the friction of the shoulder 15, and thereby prevent said friction from acting directly on the nut and possibly causing a turning of the nut.

Whenever it is desired to either raise or lower the spindle, if the laterally-extending stud 13 is not in line with either of the branching openings 18 or 18' the spindle must be turned slightly to cause the proper registration. If, for example, the stud is in line with the branch opening 18, the spindle is next raised, so as to draw the stud 13 through said branch opening and onto the upwardly-inclined ledge 21. The spindle is next turned so as to cause the stud to ride upwardly on said inclined ledge to the limit permitted by contact with the shoulder 23. The spindle is then allowed to drop and the stud seats itself in the socket 20, between the shoulders 22 and 23. By now turning the chair-seat or the spindle the stud will be caused to act on either the shoulder 22 or 23, in accordance with the direction of turning, and the nut will be thereby carried around with the spindle and said nut caused to engage the threads of the opening 9, and hence the nut, the collar 16, and the spindle seated on said collar will be raised or lowered, as the case may be. In like manner the vertical adjustment can be secured by permitting the stud to pass upwardly through the branch opening 18', thence along the upwardly-inclined ledge 21', and thence into the socket 20'.

It is obvious that the stud 13 could project outwardly from opposite sides of the stem 12 instead of only from one side thereof, so as to thereby engage both sockets 20 and 20' at the same time, without departing from the spirit and scope of my invention, or, again, the stud could project from one side of the stem and only one of the branch openings 18 or 18' and only one of the wings 19 or 19' and the socket above the same, with the shoulders for said socket, could be provided and the function described accomplished, and such variation or change would be considered within the spirit and scope of my invention. Successful results might also be obtained by omitting altogether the collar 16; but this by practice has been found very desirable, inasmuch as by the employment of the same the direct friction of the shoulder 15 of the spindle against the nut is avoided. The collar 16 might also only be provided with one of the projecting lugs 17 and the central opening 9 of the hub with only one of the vertical recesses. I therefore consider such changes and other slight variations within the scope of my invention.

What I claim as my invention is—

1. The combination, of a hub having a vertical screw-threaded opening, a spindle fitting freely in said opening, said spindle provided with a reduced portion, a shoulder being formed where the reduced portion joins the main portion of the spindle, a nut loosely carried on the reduced portion of the spindle, and adapted to engage the threads of the hub-opening, a collar also carried on the reduced portion of the spindle and interposed between the nut and the shoulder of the spindle, means whereby the collar is held against rotation, and clutch mechanism between the nut and the spindle, said clutch mechanism being normally out of engagement so as to permit free revolution of the spindle without revolving the nut therewith, but said clutch mechanism constructed to be thrown into engagement and thereby revolve the nut with the spindle and cause a vertical movement of the nut and spindle.

2. The combination, of a hub having a vertical screw-threaded opening, a spindle fitting freely in said opening, said spindle provided with a projecting stem, the stem having a stud projecting laterally from the lower end thereof, and a nut provided with a main opening through which the stem passes freely, and the lower end of the nut having an opening branching from the main opening and a wing extending to the main opening, said branching opening leading upwardly to a socket above the wing, said socket being provided with projecting shoulders, the stud of the spindle being normally below the lower end of the nut, whereby the spindle is adapted to revolve freely without carrying the nut therewith, and said stud when in line with the branching opening, and when the spindle is raised, adapted to be carried up into the socket and supported between the shoulders of the socket, whereby as the spindle is turned the nut is turned therewith to cause a vertical movement of the nut and spindle.

3. The combination of a hub having a vertical screw-threaded opening, a spindle fitting freely in said opening, said spindle provided with a projecting stem, the stem having a stud projecting laterally from the lower end thereof, a nut provided with a main opening through which the stem passes freely, and the lower end of said nut having an opening branching from the main opening and a wing extending to the main opening, said branching opening leading upwardly to a socket above the wing, said socket being provided with projecting shoulders, the stud of the spindle being normally below the lower end of the nut, whereby the spindle is adapted to revolve freely without carrying the nut therewith, and said stud when in line with the branching opening, and when the spindle is raised, adapted to be carried up into the socket and supported between the shoulders of the socket, whereby as the spindle is turned the nut is turned therewith to cause a vertical movement of the nut and spindle, a collar through which the stem of the spindle passes freely, said collar being interposed between the nut and a shoulder on the spindle, and means for holding the collar against turning.

4. The combination, of a hub having a vertical screw-threaded opening, a spindle fitting freely in the opening, said spindle provided with a projecting stem, said stem having a stud projecting laterally from the lower end thereof, and a nut provided with a main opening through which the stem passes freely, and the lower end of the nut having an opening branching from the main opening and a wing extending to the main opening, said branching opening leading upwardly by an inclined ledge to a socket above the wing, said socket being provided with projecting shoulders, the stud of the spindle being normally below the lower end of the nut, whereby the spindle is adapted to revolve freely without carrying the nut therewith, and said stud when in line with the branching opening, and when the spindle is raised, adapted to be carried up the upwardly-inclined ledge to and into the socket and supported between the shoulders of the socket, whereby as the spindle is turned the nut is turned therewith to cause a vertical movement of the nut and spindle.

5. The combination, of a hub having a vertical screw-threaded opening, a spindle fitting freely in the opening, said spindle provided with a projecting stem, said stem having a stud extending laterally from the lower end thereof, and a nut provided with a main opening through which the stem passes freely, and the lower end of the nut having openings branching from the main opening and wings extending to the main openings, said branching openings leading upwardly to sockets above the wings, said sockets being provided therein with shoulders, the stud of the spindle being normally below the lower end of the nut, whereby the spindle is adapted to revolve freely without carrying the nut therewith, and said stud when in line with either of the branch openings, and when the spindle is raised, adapted to be carried into either of the sockets and supported between the shoulders thereof, whereby as the spindle is turned the nut is turned therewith to cause a vertical movement of the nut and spindle.

In testimony whereof I affix my signature in presence of two witnesses.

JULIUS M. GERMANSON.

Witnesses:
  A. L. MORSELL,
  ANNA V. FAUST.